United States Patent
DeGeorge et al.

(10) Patent No.: US 7,854,683 B2
(45) Date of Patent: Dec. 21, 2010

(54) TORQUE CONVERTER CLUTCH CONTROL

(75) Inventors: John W. DeGeorge, Michigan Center, MI (US); Javed A. Dada, Lapeer, MI (US); Harish Sivasubramanian, Rochester, MI (US); Gary K. Lowe, Troy, MI (US); Gary Binienda, Clarkston, MI (US); Peter Hartman, West Bloomfield, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 1080 days.

(21) Appl. No.: 11/422,991

(22) Filed: Jun. 8, 2006

(65) Prior Publication Data

US 2007/0287594 A1    Dec. 13, 2007

(51) Int. Cl.
    *B60W 10/02* (2006.01)
(52) U.S. Cl. .............. 477/176; 477/174; 477/168; 477/169; 477/172; 701/90
(58) Field of Classification Search ............ 477/169, 477/168, 172, 176; 192/3.3, 3.31, 103 F
    See application file for complete search history.

(56) References Cited

U.S. PATENT DOCUMENTS

| | | | | |
|---|---|---|---|---|
| 3,693,478 A * | 9/1972 | Malloy | ............ | 477/65 |
| 4,071,125 A * | 1/1978 | Jameson | ............ | 192/3.3 |
| 4,318,312 A * | 3/1982 | Morimoto et al. | ............ | 477/155 |
| 4,428,467 A * | 1/1984 | Hiramatsu | ............ | 192/3.31 |
| 4,577,737 A * | 3/1986 | Niikura et al. | ............ | 477/168 |
| 4,593,581 A * | 6/1986 | Omitsu | ............ | 477/43 |
| 4,706,790 A * | 11/1987 | Lockhart et al. | ............ | 192/3.3 |
| 4,774,858 A * | 10/1988 | Ganoung | ............ | 477/32 |
| 4,875,391 A * | 10/1989 | Leising et al. | ............ | 477/155 |
| 4,940,122 A | 7/1990 | Fujieda | | |
| 5,129,286 A | 7/1992 | Nitz et al. | | |
| 5,226,513 A * | 7/1993 | Shibayama | ............ | 477/169 |
| 5,413,539 A | 5/1995 | Leonard et al. | | |
| 5,468,196 A * | 11/1995 | Minowa et al. | ............ | 477/62 |
| 5,498,217 A * | 3/1996 | Maruyama et al. | ............ | 477/169 |
| 5,527,238 A * | 6/1996 | Hrovat et al. | ............ | 477/166 |
| 5,577,980 A | 11/1996 | Yukovich et al. | | |
| 5,580,334 A * | 12/1996 | Minowa et al. | ............ | 477/168 |
| 5,625,558 A * | 4/1997 | Togai et al. | ............ | 701/93 |
| 5,890,468 A * | 4/1999 | Ozawa | ............ | 123/561 |
| 6,039,675 A * | 3/2000 | Adachi et al. | ............ | 477/174 |
| 6,063,004 A * | 5/2000 | Ibamoto et al. | ............ | 477/47 |
| 6,085,136 A | 7/2000 | Katakura et al. | | |
| 6,132,336 A * | 10/2000 | Adachi et al. | ............ | 477/169 |

(Continued)

*Primary Examiner*—Khoi Tran
*Assistant Examiner*—Kyung J Kim
(74) *Attorney, Agent, or Firm*—Ralph E. Smith

(57) ABSTRACT

A system for controlling a torque converter clutch in a vehicle powertrain includes a controller having an input for receiving powertrain operating parameter information. The controller is configured to determine a torque converter speed ratio based on the powertrain operating parameter information and to compare the speed ratio to a specified speed ratio limit. The controller is further configured to determine a target torque converter slip when the speed ratio exceeds or meets or exceeds the specified speed ratio limit; to compare the target slip with a desired slip value based on an vehicle noise, vibration or harshness (NVH) limit; and to control torque transmission of the torque converter clutch based on comparison of the target slip and the desired slip value. A method for controlling a torque converter clutch is also provided.

17 Claims, 3 Drawing Sheets

U.S. PATENT DOCUMENTS 6,537,178 B1 * 3/2003 Takizawa et al. ............... 477/76
2004/0157705 A1 * 8/2004 Nobumoto et al. ........... 477/174
2006/0094564 A1 * 5/2006 Ilda et al. ...................... 477/62

* cited by examiner

TORQUE CONVERTER CLUTCH CONTROL

BACKGROUND

Automatic transmissions are typically equipped with clutches to "lockup" their torque converters to varying degrees under certain operating conditions. The lockup clutch typically provides for direct drive when a vehicle is cruising at higher speeds. Since there is always some slippage in the fluid coupling of a torque converter, some power is lost and fuel economy may suffer to some degree. By providing a direct mechanical coupling through the transmission at relatively high engine speeds, the lockup clutch, among other things, may improve fuel economy.

SUMMARY

A system for controlling a torque converter clutch in a vehicle powertrain is provided. In an embodiment, the system includes a controller having an input for receiving powertrain operating parameter information. The controller is configured to determine a torque converter speed ratio based on the powertrain operating parameter information and to compare the speed ratio to a specified speed ratio limit. The controller is further configured to determine a target torque converter slip when the speed ratio exceeds a specified speed ratio limit, to compare the target slip with a desired slip value based on a vehicle noise, vibration or harshness (NVH) limit, and to control torque transmission of the torque converter clutch based on comparison of the target slip and the desired slip value. A method for controlling a torque converter clutch is also provided.

BRIEF DESCRIPTION OF THE DRAWINGS

Embodiments of the invention will now be described, by way of example, with reference to the accompanying drawings, wherein.

DETAILED DESCRIPTION

Figure 1:
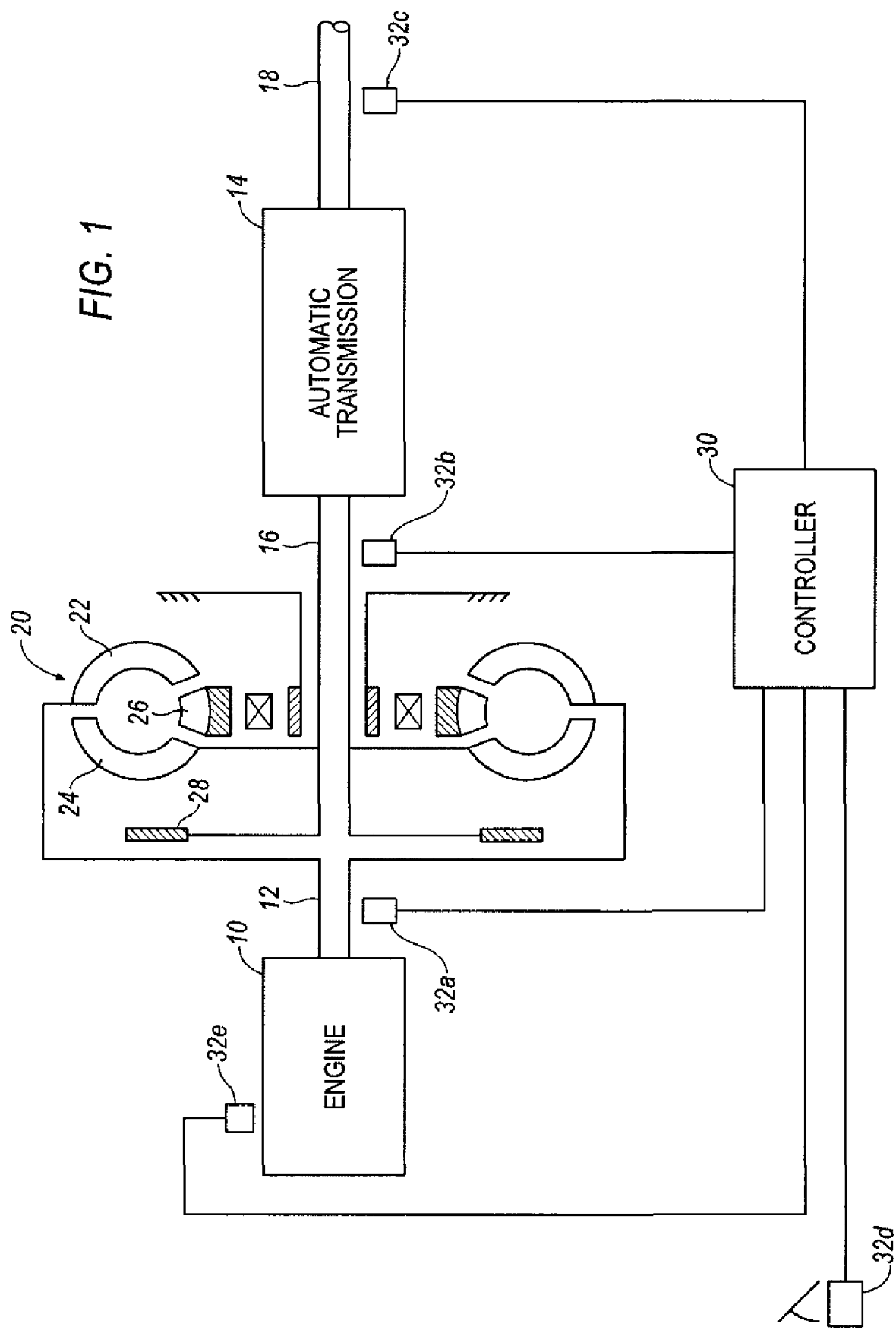
FIG. 1 is a schematic illustration of an exemplary vehicle powertrain system including a torque converter with a lockup clutch and a control system according to an embodiment of the present invention.

Referring to FIG. 1, a schematic illustration of an exemplary powertrain system is shown that includes an engine 10 having an output shaft 12 and an automatic transmission 14 having an input shaft 16 and an output shaft 18. Positioned between engine output shaft 12 and transmission input shaft 16 is a torque converter 20. Torque converter 20 includes an impeller 22 operatively connected to engine output shaft 12, a turbine 24 operatively connected to transmission input shaft 16, and a stator 26 situated between impeller 22 and turbine 24. Torque converter 20 also includes a lockup clutch 28 that is selectively engaged to mechanically connect impeller 22 for rotation with turbine 24. Lockup clutch 28 may be completely engaged, whereby impeller 22 rotates together with turbine 24 without substantial slip, or may be partially engaged, whereby impeller 22 rotates together with turbine 24 with some degree of slip. Lockup clutch 28 may be operated hydraulically, for example, by a hydraulic solenoid (not shown). It will be appreciated that torque converter 20 is not limited to the design shown in FIG. 1 and that other torque converter designs are within the scope of this invention.

As further shown in FIG. 1, the illustrated powertrain system also includes a controller 30, such as a microprocessor-based controller having, for example, an input/output device, a central processing unit, a random access memory and/or a read-only memory (none shown). Controller 30 may be a transmission controller, for example, or may include or be integrated in another vehicle controller, such as a main vehicle controller or engine controller. Controller 30 receives powertrain operating parameter information from various sensors 32a-e and outputs signals for controlling, among other things, operation of lockup clutch 28. Sensors 32a-e may include, without limitation, an engine speed sensor 32a, a turbine speed sensor 32b, an output shaft speed sensor 32c, a throttle position sensor 32d and a fluid flow sensor 32e. Engine speed sensor 32a detects, for example, revolution of engine output shaft 12 and generates a signal indicative of the detected engine revolution. The turbine speed sensor 32b detects, for example, revolution of transmission input shaft 16 and generates a signal indicative of the detected transmission input shaft speed. Output shaft speed sensor 32c detects, for example, revolution of transmission output shaft 18 and generates a signal indicative of the detected transmission output shaft revolution. The throttle position sensor 32d detects, for example, position or degree of opening of the engine throttle or throttle pedal position and generates a signal indicative of the detected throttle opening or throttle pedal position. Certain operating parameter information may also be calculated based on other detected operating parameter information. For example, flywheel torque may be calculated based on a given engine speed and engine horsepower rating.

As used herein, the term "fluid" is meant to encompass a variety of fluids that can be utilized in similar environments, including air and/or fuel. Similarly, the term "fluid flow" refers to and encompasses the flow of such fluids. For example, for some embodiments of the invention, fluid flow may be synonymous with air flow. However, with respect to other embodiments, such as in connection with a diesel engine, the associated fluid flow may correspond to fuel flow.

Figure 2A:
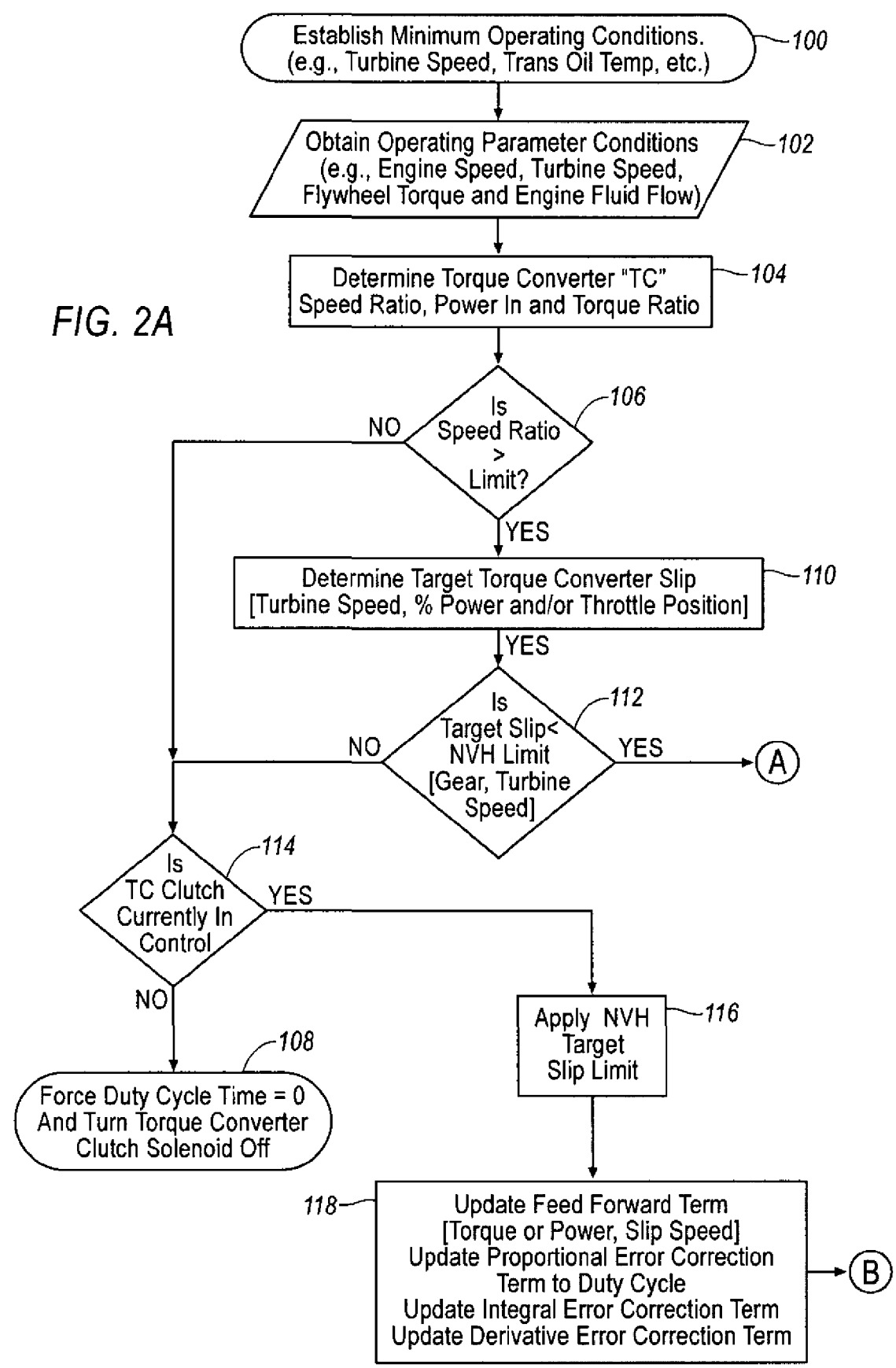
FIGS. 2A and 2B are a flow chart of a method for controlling a torque converter clutch according to an embodiment of the present invention.

A method for controlling a torque converter clutch according to an embodiment of the present invention is described with reference to FIGS. 2A and 2B. In an embodiment, controller 30 may first establish minimum powertrain operating conditions, such as, for example, turbine speed and transmission oil temperature (step 100), prior to controlling lockup clutch 28. If minimum powertrain operating conditions are established, controller 30 may then obtain (e.g., calculate or measure) powertrain operating parameter information, such as, engine speed, turbine speed, flywheel torque and engine fluid flow (step 102). Based on the obtained powertrain operating parameter information, controller 30 may then determine (e.g., calculate) a torque converter speed ratio based on the ratio between turbine 24 speed and impeller 22 speed (step 104). The speed ratio is then compared to a specified or predetermined limit (step 106). As used herein, the term "specified" is used to mean specified or predetermined. If the speed ratio is not greater than a specified limit, it can be determined if the clutch is currently in control (step 114). If not, the lockup clutch 28 is not engaged or is disengaged through an appropriate control scheme, such as, for example, forcing a duty cycle timer to equal zero (0) and turning the torque converter clutch solenoid off (step 108). Conversely, if the clutch is determined to be in control (e.g., step 114), an NVH target slip limit can be applied (step 116) and certain updates can occur (see e.g., step 118), for example, prior to a comparison of filtered engine fluid flow with actual engine fluid flow (e.g., step 126).

Alternatively, if the speed ratio (e.g., at step 106) is greater than the specified limit, controller 30 may then determine a target torque converter slip based on, for example, turbine speed, percent engine power and/or engine throttle position (step 110). If desired, controller 30 may have stored in a memory a retrievable data matrix or table that contains desired values of torque slip mapped against various operating states associated with the vehicle or various components of the vehicle. These values may be specified or predetermined to meet, among other things, torque multiplication demand and torque-variation suppression demand required for varying vehicle-operating states and noise, vibration and harshness (NVH) conditions. The NVH conditions may vary according to a particular gear selected in the transmission or the speed of turbine 24, for example, and the desired values of torque slip can be selected to limit vehicle NVH during a corresponding operating state. Accordingly, controller 30 may receive vehicle operating information, such as engine speed, throttle position and vehicle speed, which describe a current operating state of the vehicle, and perform a table look-up operation of the desired slip table (based on input variables) to determine a desired slip based on a NVH limit.

The target slip can then be compared to the desired slip based on a NVH limit (step 112). If the target slip is not less than (or, as may be desired, generally equal to) the NVH Limit or desired slip, then, the system may proceed as previously described in connection with illustrated step 114. Alternatively, if the target slip does exceed the desired slip based on a NVH limit, controller 30 controls torque transmission by the lockup clutch 28 to decrease the deviation between the target slip and desired slip.

In order to decrease the deviation, controller performs a feedback control. For example, using a feedback control loop, controller 30 determines a lockup clutch engagement force command, which the controller then translates into a duty cycle signal. When lockup clutch 28 is operated by a solenoid, the solenoid is controlled by the duty cycle signal. As an example, increasing the duty of the solenoid causes the lockup clutch 28 engagement force to increase, while decreasing the duty causes the lockup clutch engagement force to decrease.

In an embodiment of the invention, it may be determined whether or not lockup clutch 28 is currently in control (step 120) after it is determined that the target slip exceeds the desired slip (step 112). If lockup clutch 28 is not in control, an initial feed forward control term may be determined, based on, for example, desired slip and flywheel torque or engine power, and the non-linear duty cycle control for lockup clutch 28 may be initialized (step 122). Alternatively, if lockup clutch 28 is in control, the feed forward control term may be updated and various error correction terms to the duty cycle control may be updated, such as proportional, integral and derivative error correction terms (step 124).

Figure 2B:
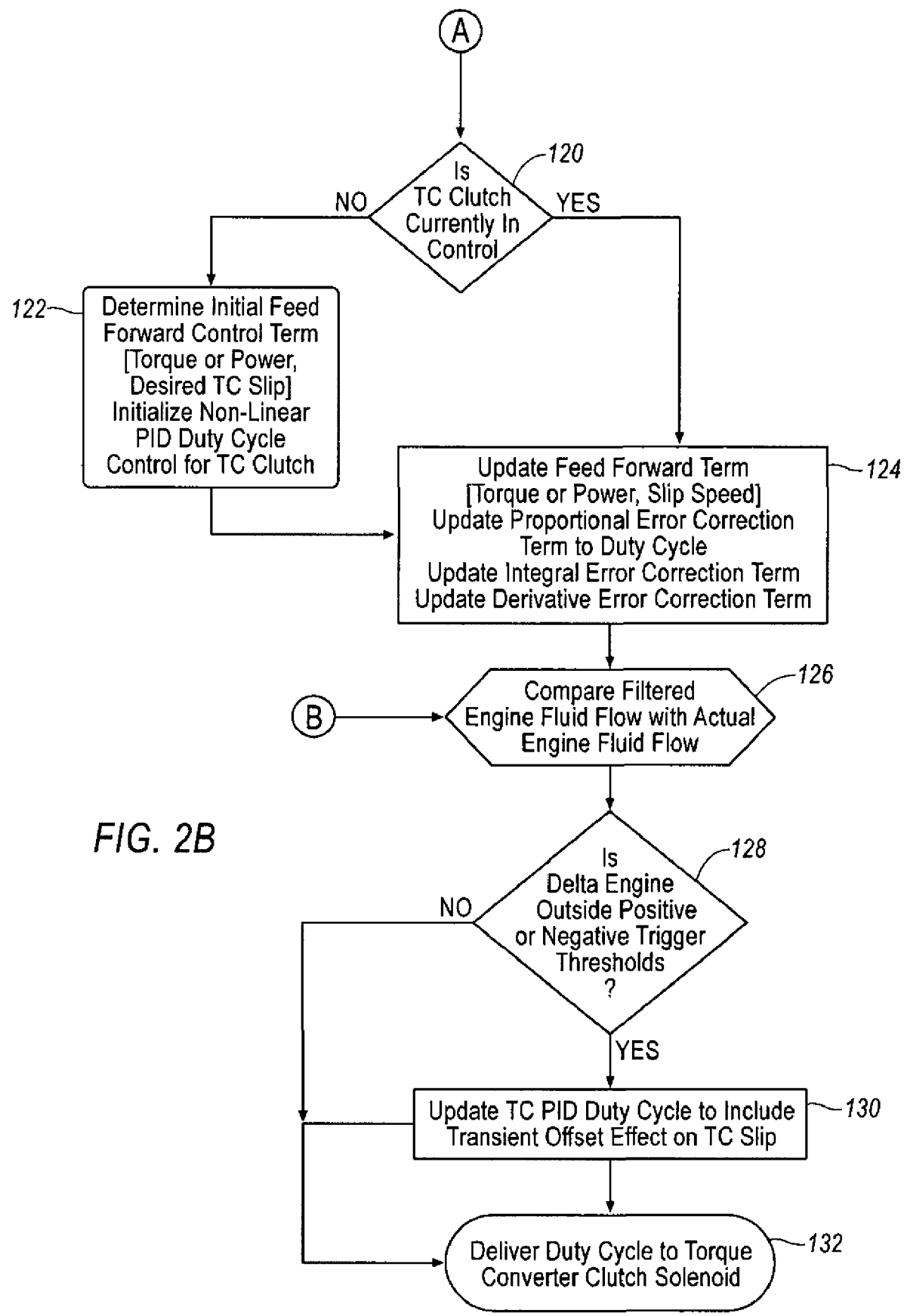

Referring to FIG. 2B, the duty cycle may be further adjusted according to a change in engine fluid flow. In an embodiment of the invention, controller 30 may compare filtered engine fluid flow with actual engine fluid flow (step 126). The change in engine fluid flow, or "delta," is then compared to a given or predetermined threshold, such as a positive or negative trigger threshold (step 128). If the associated delta is outside the given or predetermined threshold, then the duty cycle is updated to include a given or predetermined transient offset effect on the torque converter slip (step 130). Alternatively, if the change in engine fluid flow is within the given or predetermined threshold, then the duty cycle is delivered to the lockup clutch solenoid unadjusted (step 132).

It is important to note that with respect to the various comparisons discussed above, as well as shown in connection with the associated figures, where a first value is compared to a second value, the comparison need not be limited to the comparative assessment as expressed, and may instead be made using other analytical assessments without departing from the scope and spirit of the invention. For example, there are instances where a first value (such as a speed ratio) is compared to a second value (such as a limit) to determine if the first value exceeds the second value and, if it does, a desired (affirmative) response occurs or an action is initiated. However, without departing from the teachings of the invention, the resultant response or action (e.g., those embodied by the "yes" or "no" paths presented in the figures) could instead, for example, be dependent upon an assessment as to whether the first value is equal to the second value or whether the first value is equal to or greater than the second value, i.e., whether the first value "meets or exceeds" a given second value.

In a similar manner, there may be decision points noted in connection with the aforementioned system and methodologies in which a first value is compared to a second value (for instance at element 112) to determine if the first value "is less than" or "does not meet or exceed" a second value. For such instances, if desired or appropriate, the positive (or "yes") result may instead be set so as to have the desired resulting (affirmative) effect when the first value equals the second value. Again turning to element 112, as a general example, rather than the affirmative ("yes") result being based upon a Target Slip being less than an NVH Limit, it could instead, if desired and appropriate, be based upon the Target Slip being less than or equal to a specified NVH limit. Moreover, it could also be expressed conversely, as for example "does the NVH Limit exceed or meet or exceed the Target Slip."

The present invention has been particularly shown and described with reference to the foregoing embodiments, which are merely illustrative of the best modes for carrying out the invention. It should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

What is claimed is:

1. A system for controlling a torque converter clutch in a vehicle powertrain, comprising:

a controller having an input for receiving powertrain operating parameter information, the controller configured to preliminarily establish that a minimum powertrain operating condition has been achieved and then determine a torque converter speed ratio based on the powertrain operating parameter information and to compare the speed ratio to a specified speed ratio limit; the controller further configured to determine a target torque converter slip when the speed ratio exceeds or meets the specified speed ratio limit; to compare the target slip with a desired slip value based on a vehicle noise, vibration or harshness (NVH) limit; and to control torque transmission of the torque converter clutch based on comparison of the target slip and the desired slip value based on an NVH limit.

2. The system of claim 1, wherein the powertrain operating parameter information includes at least one of vehicle engine speed, torque converter turbine speed, engine flywheel torque and engine fluid flow.

3. The system of claim 1, wherein the torque converter includes an impeller and a turbine, and wherein the torque converter speed ratio is the ratio of turbine speed to impeller speed.

4. The system of claim 1, wherein the controller is further configured to not engage or disengage the clutch if the speed ratio is less than or does not meet or exceed the specified speed ratio limit.

5. The system of claim 1, wherein the clutch is operated by a duty cycle controlled solenoid, and wherein the controller is further configured to set a duty cycle timer to equal zero and turn the torque converter clutch solenoid off if the speed ratio is less than or does not meet or exceed the specified speed ratio limit.

6. The system of claim 1, wherein the target torque converter slip is based on at least one of torque converter turbine speed, percent engine power and engine throttle position.

7. The system of claim 1, wherein the controller has a memory storing a retrievable table that contains desired values of torque slip mapped against various operating states associated with the vehicle or components of the vehicle.

8. The system of claim 7, wherein the desired values of torque slip are specified to meet torque multiplication demand and torque-variation suppression demand required for varying vehicle-operating states and noise, vibration and harshness (NVH) conditions.

9. The system of claim 8, wherein the desired values of torque slip are selected to limit vehicle NVH.

10. The system of claim 1, wherein the clutch is operated by a duty cycle controlled solenoid, and wherein the controller is further configured to set a duty cycle timer to equal zero and turn the torque converter clutch solenoid off if the target slip exceeds or meets the desired slip.

11. The system of claim 10, wherein the controller is configured to adjust the duty cycle according to or based upon a change in engine fluid flow.

12. The system of claim 11, wherein the controller is further configured to compare the change in engine fluid flow to a specified threshold.

13. The system of claim 1, wherein the controller is configured to control torque transmission of the torque converter clutch to reduce the deviation between the target slip and desired slip based on an NVH limit if the target slip exceeds or meets the desired slip.

14. A method for controlling a torque converter clutch in a vehicle powertrain, comprising:

evaluating whether a minimum powertrain operating condition has been established;

determining a torque converter speed ratio based on powertrain operating parameter information;

comparing the speed ratio to a specified speed ratio limit;

determining a target torque converter slip when the speed ratio exceeds or meets the specified speed ratio limit;

comparing the target slip with a desired slip value based on a vehicle noise, vibration or harshness (NVH) limit; and controlling torque transmission of the torque converter clutch based on comparison of the target slip and the desired slip value based on an NVH limit.

15. A system for controlling a torque converter clutch in a vehicle powertrain, comprising:

a clutch solenoid operable in response to a duty cycle signal to control torque transmission of the torque converter clutch; and a controller having an input for receiving powertrain operating parameter information, the controller configured to:

evaluate whether a minimum powertrain operating condition has been established;

determine a torque converter speed ratio based on the powertrain operating parameter information and to compare the speed ratio to a specified speed ratio limit;

determine a target torque converter slip when the speed ratio exceeds or meets the specified speed ratio limit; to compare the target slip with a desired slip value based on a vehicle noise, vibration or harshness (NVH) limit; and to control the duty cycle based on comparison of the target slip and the desired slip value based on an NVH limit; and to adjust the duty cycle signal according to a change in engine fluid flow.

16. A method for controlling a torque converter clutch in a vehicle powertrain, comprising:

providing a clutch solenoid operable in response to a duty cycle signal to control torque transmission of the torque converter clutch;

evaluating whether a minimum powertrain operating condition has been established;

determining a torque converter speed ratio based on powertrain operating parameter information and comparing the speed ratio to a specified speed ratio limit;

determining a target torque converter slip when the speed ratio either exceeds or meets the specified speed ratio limit; comparing the target slip with a desired slip value based on a desired vehicle noise, vibration or harshness (NVH) limit; and controlling the duty cycle based on comparison of the target slip and the desired slip value based on an NVH limit; and adjusting the duty cycle signal according to a change in engine fluid flow.

17. The system of claim 1, wherein the evaluated minimum powertrain operating condition is transmission oil temperature.

* * * * *